US012536791B2

(12) United States Patent
Jacob et al.

(10) Patent No.: US 12,536,791 B2
(45) Date of Patent: Jan. 27, 2026

(54) ONLINE KNOWLEDGE DISTILLATION FOR MULTI-TASK LEARNING SYSTEM, METHOD, DEVICE, AND PROGRAM

(71) Applicant: Rakuten Group, Inc., Tokyo (JP)

(72) Inventors: Geethu Jacob, Karnataka (IN); Vishal Agarwal, Karnataka (IN); Bjorn Stenger, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 617 days.

(21) Appl. No.: 17/877,159

(22) Filed: Jul. 29, 2022

(65) Prior Publication Data
US 2024/0037930 A1 Feb. 1, 2024

(51) Int. Cl.
| | |
|---|---|
| *G06K 9/00* | (2022.01) |
| *G06N 3/08* | (2023.01) |
| *G06T 3/4046* | (2024.01) |
| *G06T 7/50* | (2017.01) |
| *G06V 10/26* | (2022.01) |
| *G06V 10/764* | (2022.01) |
| *G06V 10/774* | (2022.01) |
| *G06V 10/94* | (2022.01) |
| *G06V 10/96* | (2022.01) |

(52) U.S. Cl.
CPC ............... *G06V 10/96* (2022.01); *G06N 3/08* (2013.01); *G06T 3/4046* (2013.01); *G06T 7/50* (2017.01); *G06V 10/26* (2022.01); *G06V 10/764* (2022.01); *G06V 10/7747* (2022.01); *G06V 10/95* (2022.01); *G06T 2207/20081* (2013.01)

(58) Field of Classification Search
None
See application file for complete search history.

(56) References Cited

U.S. PATENT DOCUMENTS

| | | | |
|---|---|---|---|
| 2021/0056361 A1* | 2/2021 | Xiu | G06F 18/2193 |
| 2024/0246564 A1* | 7/2024 | Tiwary | G06V 10/82 |

* cited by examiner

*Primary Examiner* — Wei Wen Yang
(74) *Attorney, Agent, or Firm* — Sughrue Mion, PLLC

(57) ABSTRACT

A method, system, apparatus, and non-transitory computer-readable medium for image processing using a multi-task neural network framework may be provided. The method be performed by one or more processors and may include receiving an input image, and performing an image processing task based on the input image using the multi-task neural network framework, wherein the multi-task neural network framework is trained using a combination of task specific losses, the task specific losses including a plurality of first losses associated with the multi-task neural network framework and a plurality of second losses associated with a plurality of single-task neural network models. The method may also include generating an output of the image processing task based on up sampling an output of the multi-task neural network framework.

19 Claims, 7 Drawing Sheets

ONLINE KNOWLEDGE DISTILLATION FOR MULTI-TASK LEARNING SYSTEM, METHOD, DEVICE, AND PROGRAM

FIELD

The present disclosure relates to image processing. More particularly, the present disclosure relates to image processing using machine learning models and multi-task neural network framework.

BACKGROUND

Multi-task learning techniques have a wide application in the domains relating to computer vision and speech recognition. Multi-task learning, in related art, relies on branched architecture where a majority of the parameters as common between the multiple tasks and only a few parameters are exclusive to specific tasks. Multi-task learning is configured to exploit information in the training data of related tasks to learn a shared representation and improve generalization.

Even though multi-task learning is an efficient architecture from a storage and speed perspective, multi-task learning techniques, especially in the computer vision and image processing domain perform worse than single-task models. Since the underlying architecture is shared between different tasks, imbalances in task difficulty of some image processing tasks can lead to an undesired emphasis on easier image processing tasks, leading to slower progress or worse performance on the difficult image processing tasks. The presence of multiple tasks being learned using a shared framework with a large proportion of shared parameters leads to performance gains in some tasks at the cost of performance degrasdation on other tasks of the multi-task framework. Solutions suggested in related art fail to preserve the storage and efficiency of the multi-task neural network framework (e.g., causing increase in storage requirements, reduced efficiency of inferences, etc.).

Therefore, methods, apparatus, and systems for multi-task learning that preserve the storage and speed of a multi-task framework and at the same time do not compromise the performance of one task for another task are needed.

SUMMARY

According to an aspect of the present disclosure, a method for image processing using a multi-task neural network framework may be provided. The method may be executed by one or more processors and may include receiving an input image; performing an image processing task based on the input image using the multi-task neural network framework, wherein the multi-task neural network framework may be trained using a combination of task specific losses, the task specific losses may include a plurality of first losses associated with the multi-task neural network framework and a plurality of second losses associated with a plurality of single-task neural network models; and generating an output of the image processing task based on up sampling an output of the multi-task neural network framework.

In some embodiments, the combination of task specific losses may be based on a plurality of task weights, wherein the plurality of task weights may correspond to respective task-heads of the multi-task neural network framework, and wherein a first task weight of the plurality of task weights may be based on a comparison of a first loss from the plurality of first losses and a first loss from the plurality of second losses.

In some embodiments, the combination of task specific losses may be a linear combination of the plurality of first losses and the plurality of second losses.

In some embodiments, the multi-task neural network framework may include a shared transformer backbone network and a plurality of task specific heads.

In some embodiments, the multi-task neural network framework and the plurality of single-task neural network models may be trained simultaneously.

In some embodiments, a same loss function may be associated with a task-head of the multi-task neural network framework and a respective single-task neural network model from the plurality of single-task neural network models.

In some embodiments, the image processing task may include a task of semantic segmentation, depth estimation, surface normal estimation, image classification, or facial landmark localization.

In some embodiments, the image processing task may include semantic segmentation of the input image, and the method may further include generating, as the output of the image processing task, a plurality of class maps of a same size as the input image based on up sampling and reshaping the output of the multi-task neural network framework.

In some embodiments, the image processing task may include one of depth prediction or surface normal prediction, and the method may include generating, as the output of the image processing task, one or more reconstructed images of a same size as the input image based on up sampling and reshaping the output of the multi-task neural network framework.

According to an aspect of the present disclosure, an apparatus for image processing using a multi-task neural network framework may be provided. The apparatus may include at least one memory configured to store program code; and at least one processor configured to read the program code and operate as instructed by the program code. The program code may include receiving code configured to cause the at least one processor to receive an input image; performing code configured to cause the at least one processor to perform an image processing task based on the input image using the multi-task neural network framework, wherein the multi-task neural network framework is trained using a combination of task specific losses, the task specific losses including a plurality of first losses associated with a plurality of task heads of the multi-task neural network framework and a plurality of second losses associated with a plurality of single-task neural network models; and generating code configured to cause the at least one processor to generate an output of the image processing task based on up sampling an output of the multi-task neural network framework.

According to an aspect of the present disclosure, a non-transitory computer-readable medium storing instructions for image processing using a multi-task neural network framework may be provided. The instructions may include one or more instructions that, when executed by one or more processors, may cause the one or more processors to receive an input image; perform an image processing task based on the input image using the multi-task neural network framework, wherein the multi-task neural network framework is trained using a combination of task specific losses, the task specific losses including a plurality of first losses associated with a plurality of task heads of the multi-task neural network framework and a plurality of second losses associated with a plurality of single-task neural network models;

and generate an output of the image processing task based on up sampling an output of the multi-task neural network framework.

According to an aspect of the present disclosure, a non-transitory computer-readable medium storing instructions for training a multi-task neural network framework for image processing, the instructions comprising: one or more instructions that, when executed by one or more processors, cause the one or more processors to: train the multi-task neural network framework using a plurality of single-task neural network models, wherein the training may include determining a plurality of first losses associated with a plurality of task heads of the multi-task neural network framework; determining a plurality of second losses associated with the plurality of single-task neural network models; and training the multi-task neural network framework based on a combination of the plurality of first losses and the plurality of second losses. In some embodiments, the combination of the plurality of first losses and the plurality of second losses may be based on a plurality of task weights, wherein the plurality of task weights correspond to respective task-heads of the multi-task neural network framework, and wherein a first task weight of the plurality of task weights is based on a comparison of a first loss from the plurality of first losses and a first loss from the plurality of second losses.

BRIEF DESCRIPTION OF THE DRAWINGS

Features, advantages, and significance of exemplary embodiments of the disclosure will be described below with reference to the accompanying drawings, in which like signs denote like elements.

DETAILED DESCRIPTION

Figure 1:
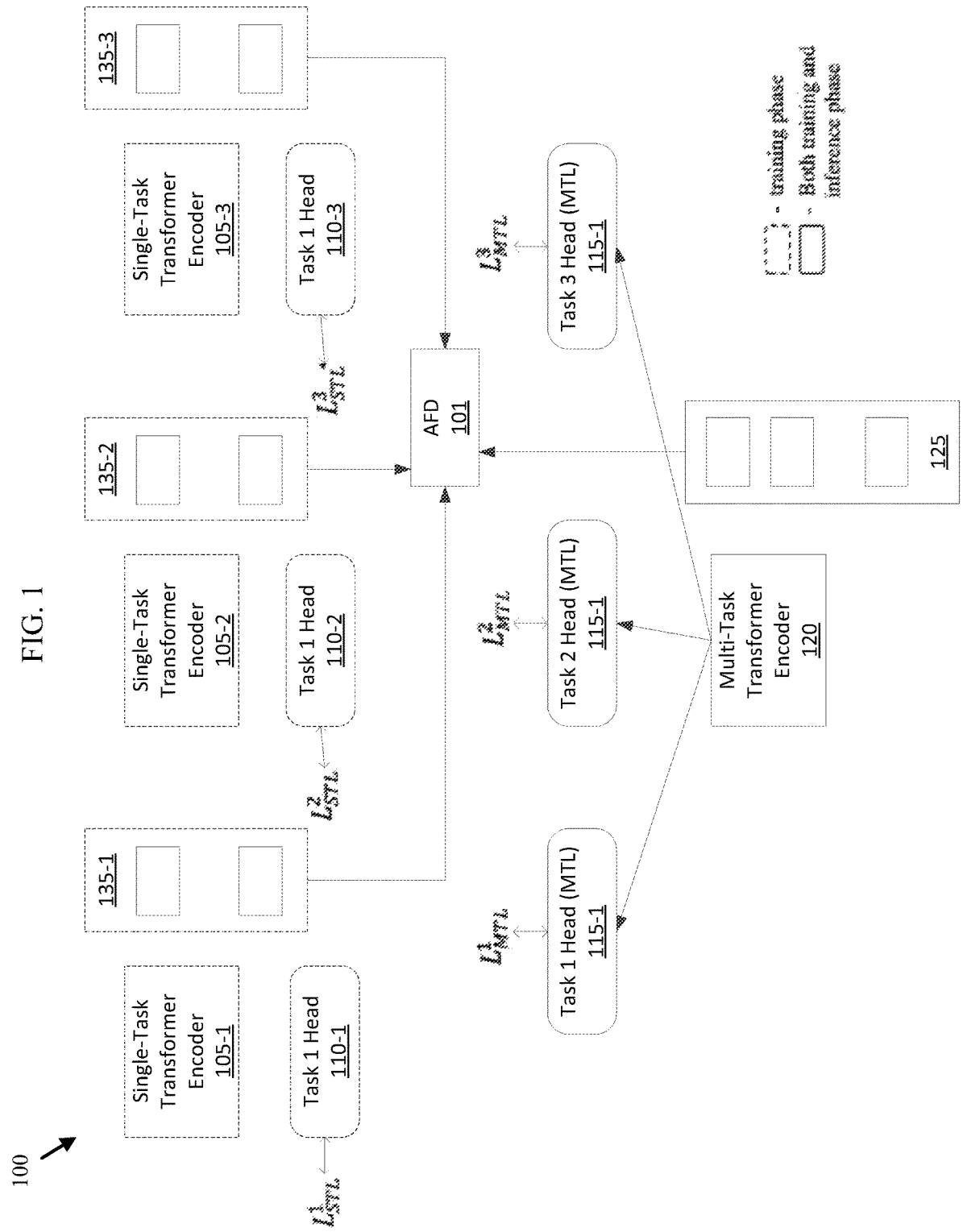
FIG. 1 is an example diagrammatic illustration of a neural network framework for image processing in which the systems and/or methods described in the present disclosure may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As stated above, even though multi-task learning is an efficient architecture from a storage and speed perspective, multi-task learning techniques, especially in the computer vision and image processing domain perform worse than single-task models. The presence of multiple tasks being learned using a shared framework with a large proportion of shared parameters leads to performance gains in some tasks at the cost of performance degradation on other tasks of the multi-task framework. A problem where the improvement in performance of one task may lead to degradation in performance of another task may be known as a "negative transfer." Some techniques in relevant art may include task weighting, feature fusion, feature selection, and knowledge distillation.

Vision transformers (ViT) may be used for many image processing tasks such as image classification, object detection, and pixel-wise prediction problems such as depth estimation and semantic segmentation. According to an embodiment of the present disclosure, a ViT based multi-task learning architecture with a shared backbone and task-specific heads to learn multiple tasks simultaneously may be used. In addition to using a ViT based architecture, online distillation may be used in an embodiment of the present disclosure. Online distillation may comprise training the multi-task neural network framework and the single-task neural network models simultaneously with the multi-task neural network framework learning or distilling knowledge from respective single-task neural network models. The online distillation may be used for training the multi-task models, leading to reduced inference time and memory requirements while achieving performance comparable to single-task neural network models.

According to an embodiment of the present disclosure, the online distillation may include adaptive feature distillation and/or online task weighting. Online task weighting schemes may include training the multi-task neural network framework and a plurality of single-task neural network models simultaneously using a combination of task-specific losses from the multi-task neural network framework and the plurality of single-task neural network models and distilling features from the plurality of single-task neural network models to the multi-task neural network framework. In some embodiments, online training may include the multi-task neural network framework and the single-task neural networks may be trained simultaneously and the feature distillation may occur for every iteration of the training.

Training the multi-task neural network framework and the single-task neural network models simultaneously and using task-specific losses from both the multi-task neural network framework and the single-task neural network models enables monitoring the performance of the task heads from the multi-task neural network framework along with the performance of the respective single-task neural network models. The combined, and sometimes parallel monitoring of the task heads from the multi-task neural network framework and the respective single-task neural network models enables an understanding of the divergence in the performance of the task heads from the multi-task neural network framework in comparison to the performance of the respective single-task neural network models. Online task weighting techniques described herein enable training the multi-task neural network with similar computational and memory requirements as that of single-task neural network models, and thus, improve the performance of the multi-task neural network framework, while preserving its memory and storage efficiency.

In some embodiments of the present disclosure, the online distillation may include adaptive feature distillation. Adaptive feature distillation may include selectively distilling feature knowledge (e.g., intermediate feature representations) from single-task neural network models to the multi-task neural network framework during training of the multi-task neural network framework. Adaptive feature distillation may enable aligning and utilizing the intermediate features of the single-task neural network models in the task heads from the multi-task neural network framework if the performance of a task head from the multi-task neural network framework is lower than the performance of a respective single-task neural network model.

In some embodiments, adaptive feature distillation and/or training using an online weighting scheme may be performed while training the multi-task neural network framework, increasing the performance of the multi-task neural network framework. By performing the adaptive feature distillation while training the multi-task neural network framework and/or training the multi-task neural network framework using the online weighting scheme, the reduced storage and increased speed advantages of multi-task learning are preserved along with an improvement in the performance of the multi-task neural network framework.

According to an embodiment, a multi-task neural network framework may consist of a shared Vision Transformer (ViT) backbone and a plurality of separate heads for N image processing tasks. The architecture may also consist of single task neural network models with single heads and ViT backbone. The ViT backbone may be specific to one task. In an embodiment, the online distillation may include a training strategy for training single-task neural network models (STL) and a multi-task neural network framework (MTL) simultaneously on $N_t$ tasks. The single-task neural network models may guide the optimization of the multi-task network throughout the training process. The multi-task network weights may be tied to the single-task neural network models through distillation losses on intermediate features. An end-to-end model may minimize the following loss function $$L = L_{AFD} + \Sigma_{i=1}^{N_t}(L_{STL}^i + \lambda_i L_{MTL}^i) \quad (1)$$

In equation 1, $L_{STL}^i$ denotes the task-specific loss for the ith single-task neural network model, $L_{MTL}^i$ is the task-specific loss for the ith head of the multi-task neural network framework, and $L_{AFD}$ denotes the adaptive knowledge distillation loss between features of the single-task and multi-task networks. The loss weights, $\lambda_i$, i=1, 2, ..., $N_t$, may be calculated at each training iteration for each task based on the loss values of single-task neural network models and head losses of respective heads of the multi-task neural network framework.

In some embodiments, a pre-trained ViT model may be used as the backbone for all models. The multi-task neural network framework may consist of a shared backbone with N heads, and the single-task neural network models may each have their separate backbone network and a single head. In some embodiments, the input images may be partitioned into P patches of 16×16 pixels. Each patch may be mapped via a patch embedding network and passed to the ViT encoder. After dividing an image of size W×H into patches, the size of the patch grid is $W/16 \sim W_{patch} \times H/16 \sim H_{patch}$. The patches may be passed to a linear embedding network and the $N_{patch} = W_{patch} \times H_{patch}$ embeddings may be input to the transformer encoders of both single-task neural network models and multi-task neural network framework.

As stated above, a well-known challenge in multi-task learning is 'negative transfer.' To mitigate this problem, online knowledge distillation may be used. The single-task neural network models and multi-task neural network framework may be optimized during the training phase. The knowledge of features of the single-task transformer encoders may be distilled to that of the multi-task model in each iteration. In some embodiments, online distillation may include adaptive feature distillation (AFD) and/or online task weighting (OTW).

Adaptive feature distillation may include sharing intermediate features of the backbone models. An online weighted knowledge distillation on intermediate features from the shared backbone of the multi-task neural network framework (MTL). Let L denote the number of layers in the shared transformer encoder, $w_i^l$ be the learnable parameter of the $i^{th}$ task in the $l^{th}$ layer. The AFD loss, $L_{AFD}$, may be defined as:

$$L_{AFD} = \Sigma_{l=1}^{L} \|f_{MTL}(l) - \Sigma_{i=1}^{N_t} w_i^l f_{STL}^i(l)\|^2 \quad (2)$$

Wherein $f_{MTL}(l)$ may be features extracted from the $l^{th}$ layer of the shared MTL backbone, $f_{STL}^i(l)$ may be the $l^{th}$ layer features from the $i^{th}$ single-task neural network model. The degree of alignment of the STL features of each task towards the MTL features is decided by the parameter $w_i^l$. The AFD function may ensure that the feature space of the MTL network is aligned with that of STL networks. Direct implementation of the above-mentioned training scheme may have a negative effect on the performance of the STL networks as the parameters would be affected by the MTL network parameters. To avoid such a negative effect, the gradients from the AFD function may be disallowed from being back-propagated to the STL networks. In an embodiment, the single-task intermediate features (e.g., tensors) $f_{STL}^i(l)$ may be detached from the computational graph of the respective single-task neural network model while computing the AFD loss.

Online task weighting may include using task-specific weights during simultaneous learning of single-task neural network models and multi-task neural network framework. The multi-task neural network may be trained using the linear combination of task-specific losses, wherein the task-specific weights may be based on the performance of the multi-task model with respect to the single-task neural network models.

$$\lambda_i(t) = N_t \frac{\exp\left(\frac{m_t^i}{\tau}\right)}{\sum_{j=1}^{N_t} \exp\left(\frac{m_t^j}{\tau}\right)} \quad (3)$$

$$m_t^i = \frac{L_{MTL}^i(t)}{L_{STL}^i(t)} \quad (4)$$

Let the multi-task model loss at any iteration t be $L_{MTL}^i(t)$ and the single-task loss $L_{STL}^i(t)$ for the $i^{th}$ image processing task. The task-specific weight for the $i^{th}$ task at iteration t may be computed as a "temperature" scaled softmax function of the ratio of multi-task to single-task loss.

According to embodiments, higher weights may be given to tasks, for which the multi-task loss is larger than the corresponding single-task loss. τ may represent a temperature which controls the softness of task weighting. A large T may result in a more even distribution between different tasks. The factor $N_t$ (number of tasks) may ensure that $\sum_{j=1}^{N_t} \lambda_i = N_t$.

According to an embodiment, given the simultaneous training, task-specific loss functions may be used for respective image processing tasks. Image processing tasks may include sematic segmentation, depth prediction, and surface loss prediction, and a same loss function may be used for a specific task across both the single-task neural network for that specific task and the task-head for that specific task in the multi-task neural network framework. Thus, in some embodiments, same loss functions may be used for a respective task in the multi-task neural network and the its corresponding single-task neural network model.

As an example, in some embodiments, cross-entropy loss may be used for semantic segmentation, SIlogloss may be used for depth estimation, and cosine similarity loss may be used for surface normal estimation. As an example, if a first task is semantic segmentation, a second task is depth prediction, and a third task is surface normal prediction, their losses may be respectfully defined as:

$$L_{MTL}^1 = -\frac{1}{N_p}\sum_{p=1}^{N_p} y_i(p)\log(\hat{y}_1(p)) \quad (5)$$

$$L_{MTL}^2 = -\frac{1}{N_p}\sum_{p=1}^{N_p} d(p)^2 - \frac{1}{N_p^2}\left(\sum_{p=1}^{N_p} d(p)\right)^2 \quad (6)$$

$$L_{MTL}^3 = 1 - \frac{1}{N_p}\sum_{p=1}^{N_p} \frac{y_3(p)^T \hat{y}_3(p)}{\|y_3(p)\|\|\hat{y}_3(p)\|} \quad (7)$$

In equations 5-7, $N_p$ may be the number of pixels and $d(p)=\log(y_2(p))-\log(\hat{y}_2(p))$ for pixel p.

As a part of visual scene understanding, multiple classification and regression tasks may be considered. As an example, for a classification task such as semantic segmentation, a mask transformer architecture may be used. Let E be the embedding size of patches and tokens passed to the transformer layers. The patches extracted from the ViT encoder (having dimension $N_{patch}*E$) backbone may be passed to the classification head of the multi-task neural network framework. Class queries (of dimension $N_{CLS} \times E$) may be introduced along with the patch embeddings and passed to two layers of transformer encoders. The number of class queries ($N_{CLS}$) may be taken as the number of classes for classification task. A scalar product of class queries and patch embeddings may be computed (of output dimension, $N_{patch} \times N_{CLS}$). The output may then be up sampled and reshaped to the image size. $N_{CLS}$ class maps may also be obtained, each having the same size as the input image. In some embodiments, pixel labels are may be estimated as the argmax of the $N_{CLS}$ class maps.

As another example, depth prediction and surface normal prediction may be formulated as regression tasks. Let $N_{reg}$ (empirically set as 128) be the number of query embeddings passed along with $N_{patch}$ embeddings, each of dimension E, to the regression head of the multi-task neural network framework. A scalar product of the queries and patches may be computed (of output dimension, $N_{patch} \times N_{reg}$) and passed through an MLP block and/or layer. A sequence of linear layers may be used in the MLP block, with the output dimension of the last linear layer being according to the image processing task. The output dimension for depth prediction may be $N_{patch} \times 1$, whereas that of surface normal prediction may be $N_{patch} \times 3$. The output may then be up sampled and reshaped to the image size.

FIG. 1 is an example diagrammatic illustration of a neural network framework 100 for image processing in which the systems and/or methods described in the present disclosure may be implemented.

As shown in FIG. 1, the framework 100 may include a multi-task neural network and a plurality of single-task neural networks. The multi-task neural network (also referred to as "multi-task neural network framework") may include a shared transformer backbone network and a plurality of task specific heads. As an example, the multi-task neural network of framework 100 may include a shared backbone of the multi-task transformer encoder 120 and task-specific heads for a plurality of tasks (e.g., task 1 head 115-1, task 2 head 115-2, and task 3 head 115-2). The framework 100 may include a plurality of single-task neural network models. A plurality of single-task neural network models may correspond to each task-head of the multi-task neural network framework, and may include single-task transformer encoders (e.g., task 1 single-task transformer encoder 105-1, task 2 single-task transformer encoder 105-2, and task 3 single-task transformer encoder 105-3). The single-task neural network models may also have a respective task-specific heads (e.g., task 1 head 110-1, task 2 head 110-2, and task 3 head 110-3).

The image processing tasks performed by the task heads of the multi-task neural network may correspond to the image processing tasks performed by the individual task heads of the single-task neural network models. Thus, task 1 head 115-1 and task 1 head 110-1 may perform a same image processing task. As an example, task 1 head 115-1 and task 1 head 110-1 may perform a first image processing task of semantic segmentation, task 2 head 115-2 and task 2 head 110-2 may perform a second image processing task of depth prediction, and task 3 head 115-3 and task 3 head 110-3 may perform a third image processing task of surface normal prediction.

Intermediate features 125 may be the intermediate features of the transformer encoder layers of the backbone of the multi-task transformer encoder 120. Intermediate features 135-1, 135-2, and 135-3 may be the intermediate features of the transformer encoder layers of the single-task transformer encoders 105-1, 105-2, and 105-3 respectively.

An adaptive feature distillation function (AFD) 101 may be used to train the multi-task neural network based on a combination of task specific losses using online task weighting. A task-specific loss may be a loss function used to train a neural network for the specific task. As an example, for the first image processing task of semantic segmentation, a task-specific loss function may be used with respect to semantic segmentation. In embodiments, the same task-specific loss function may be used for training both the semantic segmentation task task-head of the multi-task neural network and the semantic segmentation single-task neural network model. As another example, for the second image processing task of depth prediction, a task-specific loss function may be used with respect to depth prediction for training both the depth prediction task task-head of the multi-task neural network and the depth prediction single-task neural network model.

The combination of task-specific losses, sometimes referred to as online task weighting or online task weighting scheme, may include a plurality of first losses associated with the multi-task neural network framework and a plurality of second losses associated with a plurality of single-task neural network models. The plurality of first losses may include a first loss corresponding to each task-head in the multi-task neural network framework. As an example, the plurality of first losses may include $L_{MTL}^1$ associated with the semantic segmentation task and task 1 head 115-1, $L_{MTL}^2$ associated with the depth prediction task and task 2 head 115-2, and $L_{MTL}^3$ associated with the surface normal prediction task and task 3 head 115-3. The plurality of second losses associated with a plurality of single-task neural network models may include a losses corresponding to each single-task neural network model. As an example, the plurality of second losses may include $L_{STL}^1$ associated with the semantic segmentation task and task 1 head 110-1, $L_{STL}^2$ associated with the depth prediction task and task 2 head 110-2, and $L_{STL}^3$ associated with the surface normal prediction task and task 3 head 110-3.

In some embodiments, the combination of task-specific losses may be based on a plurality of task weights. The plurality of task weights may correspond to the respective task-heads of the multi-task neural network framework. As an example, a task weight $\lambda_i$ may correspond to the $i^{th}$ loss function $L_{MTL}^i$ associated with the $i^{th}$ task-head of the multi-task neural network framework. In some embodiments, the combination of task specific losses may be a linear combination of the plurality of first losses and the plurality of second losses.

In embodiments, the plurality of task weights may be based on a comparison of the plurality of first losses and the plurality of second losses. An $i^{th}$ task weight may be based on a comparison of the $i^{th}$ first loss $L_{MTL}^i$ associated with the $i^{th}$ task-head of the multi-task neural network framework and the $i^{th}$ second loss $L_{STL}^i$ associated with the $i^{th}$ single-task neural network framework. As an example, a first task weight (associated with the semantic segmentation task for example) of the plurality of task weights may be based on a comparison of a first loss (associated with the semantic segmentation task-head) from the plurality of first losses and a first loss (associated with the semantic segmentation task) from the plurality of second losses.

In some embodiments, a same loss function may be associated with a task-head of the multi-task neural network framework and respective and/or corresponding single-task neural network of the plurality of single-task neural network models. As an example, a first task-specific loss function may be used to train task 1 head 115-1 and task 1 head 110-1, a second task-specific loss function may be used to train task 2 head 115-2 and task 2 head 110-2, and a third task-specific loss function may be used to train task 3 head 115-3 and task 3 head 110-3.

While the online task weighting using adaptive distillation function 101 improves the performance of the multi-task neural network by comparing the performance of the multi-task neural network for a specific task with the single-task neural network model associated with that task, propagating the loss based on the combination of task-specific loss through the single-task neural network may negatively affect the performance of the single-task neural network because the parameters of the single-task neural network will be affected by the parameters of the multi-task neural network. To avoid a performance degradation of the single-task neural network, the gradients from the loss based on the combination of task-specific may be disallowed from being back-propagated to the single-task neural networks. In an embodiment, the gradients may be disallowed from being back-propagated to the single-task neural networks by detaching the single-task intermediate feature representations (e.g., tensors) from the computational graph while computing the adaptive feature distillation loss.

In some embodiments, the multi-task neural network framework may be trained using an adaptive feature distillation function 101. The training of the multi-task neural network framework using the adaptive distillation function 101 is described in more detail in FIG. 3.

Figure 2:
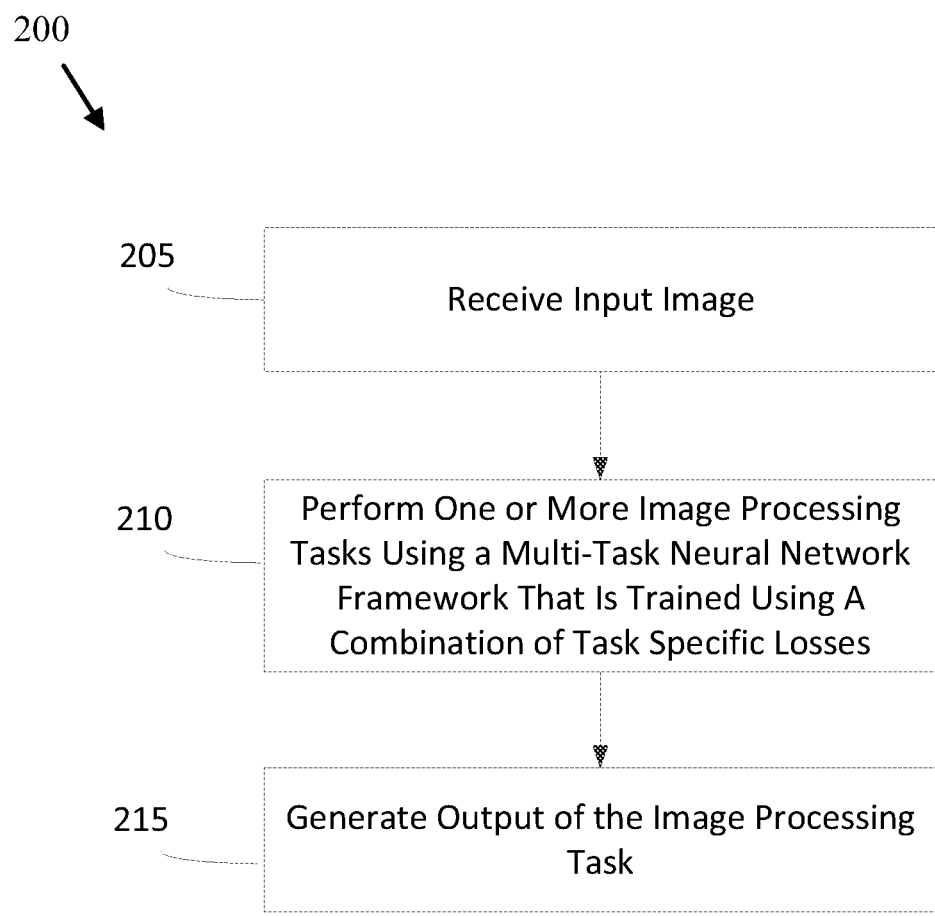
FIG. 2 is an exemplary flowchart illustrating an example process for image processing using a multi-task neural network framework, according to an embodiment of the present disclosure.

FIG. 2 is an exemplary flowchart illustrating an example process 200 image processing using a multi-task neural network framework.

As shown in FIG. 2, the process 200 may include operations 205-215. At operation 205, one or more input images may be received. The input images may be of any suitable format (e.g., JPEG, MPEG, etc.) and coded using any suitable codecs. In some embodiments, the input image may be of a predetermined size. In some embodiments, the input images may be pre-processed and one or more image patches may be generated based on the input image. In some embodiments, the one or more image patches may be a predetermined size based on the input image.

At operation 210, an image processing task may be performed based on the input image using the multi-task neural network framework. The image processing task may include one of semantic segmentation, depth estimation, surface normal estimation, image classification, or facial landmark localization. In some embodiments, a first image processing task performed by a first head of the multi-task neural network framework may include a semantic segmentation task. As an example, a second image processing task performed by a second head of the multi-task neural network framework may include a depth prediction task and a third image processing task performed by a third head of the multi-task neural network framework may include a surface normal prediction task.

In some embodiments, the multi-task neural network framework may be trained using a combination of task specific losses. In some embodiments, the task specific losses may include a plurality of first losses associated with the multi-task neural network framework and a plurality of second losses associated with a plurality of single-task neural network models. As an example, the task specific losses may include $L_{MTL}^1$, $L_{MTL}^2$, and $L_{MTL}^3$ associated with the task-heads of the multi-task neural network framework task 1 head 115-1, task 2 head 115-2, and task 3 head 115-3 respectively. In addition, the task specific losses may also include $L_{STL}^1$, $L_{STL}^2$, and $L_{STL}^3$ associated with the single-task neural network framework task 1 head 110-1, task 2 head 110-2, and task 3 head 110-3 respectively.

In some embodiments, the combination of task specific losses may be a linear combination of the plurality of first losses and the plurality of second losses. In some embodiments, the combination may be based on any suitable function.

According to an embodiment, the combination of task specific losses may be based on a plurality of task weights. The plurality of task weights correspond to respective task-heads of the multi-task neural network framework. As an example, a task weight $\lambda_i$ may correspond to the $i^{th}$ loss function $L_{MTL}^i$ associated with the $i^{th}$ task-head of the multi-task neural network framework.

In embodiments, the plurality of task weights may be based on a comparison of the plurality of first losses and the plurality of second losses. An $i^{th}$ task weight may be based on a comparison of the $i^{th}$ first loss $L_{MTL}^i$ associated with the $i^{th}$ task-head of the multi-task neural network framework and the $i^{th}$ second loss $L_{STL}^i$ associated with the $i^{th}$ single-task neural network framework. As an example, a first task weight (associated with the semantic segmentation task for example) of the plurality of task weights may be based on a comparison of a first loss (associated with the semantic segmentation task-head) from the plurality of first losses and a first loss (associated with the semantic segmentation task) from the plurality of second losses.

In some embodiments, the multi-task neural network may be trained using the online task weighting schemes as described herein, improving the performance of the multi-task neural network framework. By performing the adaptive feature distillation while training the multi-task neural network framework and/or training the multi-task neural network framework using the online weighting scheme, the reduced storage and increased speed advantages of multi-task learning are preserved along with an improvement in the performance of the multi-task neural network framework.

At operation 215, the output of the image processing task may be generated based on up sampling the output of the multi-task neural network framework. In some embodiments, the output of the multi-task neural network framework may be a scalar product. The scalar product may then be up sampled and processed to generate the output of the image processing task.

As an example, for a semantic segmentation image processing task, class queries and the patch embeddings may be input into the multi-task neural network framework and/or the transformer encoder of the multi-task neural network framework. The output of the multi-task neural network framework and/or the classification head of the multi-task neural network framework may be a scalar product based on the class queries and the patch embeddings. Then, the scalar product may be up sampled and reshaped to the image size to obtain class maps, each class map being a same size as the input image.

As another example, for a depth prediction task or a surface normal prediction task, query embeddings and the patch embeddings may be input into the multi-task neural network framework. The output of the multi-task neural network framework and/or the regression head of the multi-task neural network framework may be a scalar product based on the query embeddings and the patch embeddings. Then, the scalar product may be passed through an MLP block, up sampled, and/or resized. The MLP block may have an output dimension of the last linear layer based on the image processing task.

Figure 3:
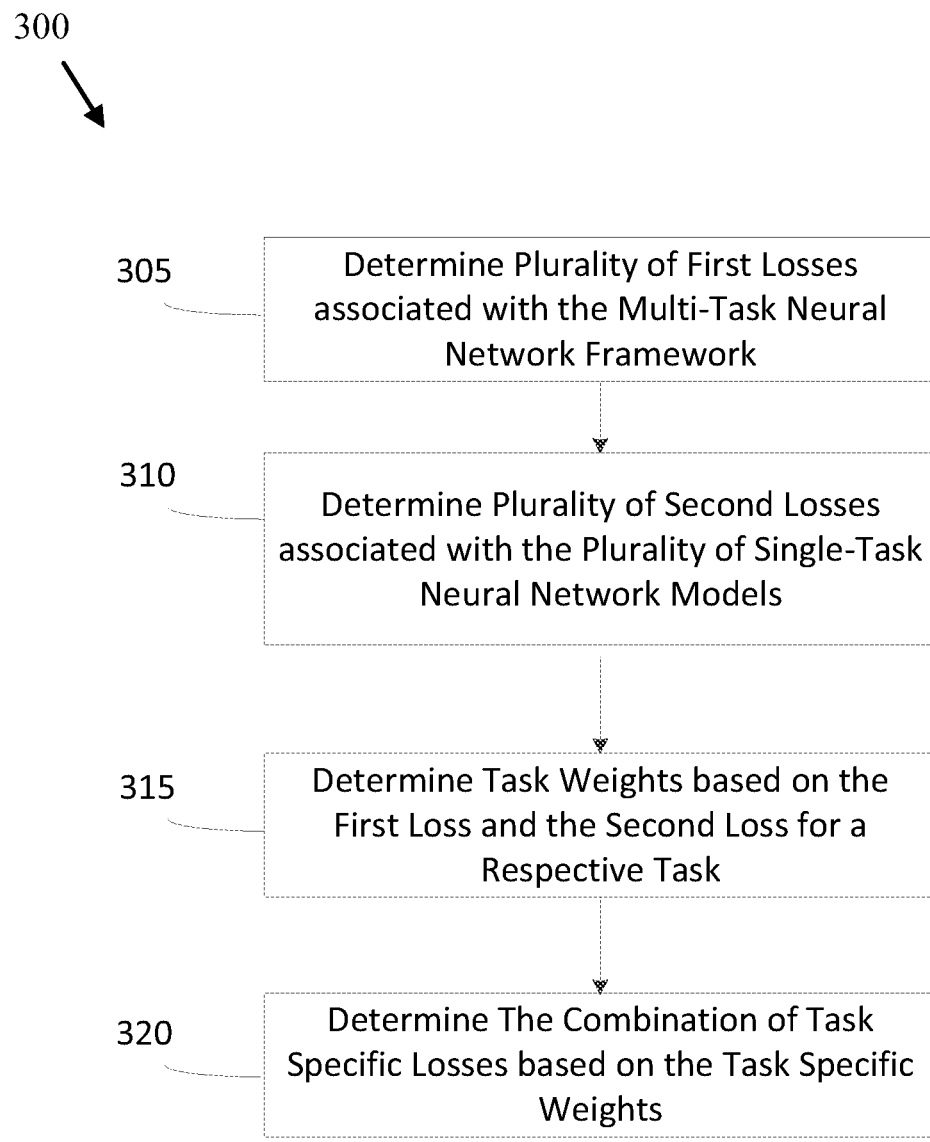
FIG. 3 is an exemplary flowchart illustrating an example process for image processing using a multi-task neural network framework, according to an embodiment of the present disclosure.

FIG. 3 is an exemplary flowchart illustrating an example process 300 for training the multi-task neural network framework using online task weighting. According to embodiments, the process 300 may be repeated for selective training iterations or each training iteration.

At operation 305, a plurality of first losses associated with the multi-task neural network framework may be determined. The plurality of first losses may include a first loss corresponding to each task-head in the multi-task neural network framework. As an example, the plurality of first losses may include $L_{MTL}^1$ associated with the semantic segmentation task and task 1 head 115-1, $L_{MTL}^2$ associated with the depth prediction task and task 2 head 115-2, and $L_{MTL}^3$ associated with the surface normal prediction task and task 3 head 115-3.

At operation 310, a plurality of second losses associated with the multi-task neural network framework may be determined. The plurality of second losses associated with a plurality of single-task neural network models may include a losses corresponding to each single-task neural network model. As an example, the plurality of second losses may include $L_{STL}^1$ associated with the semantic segmentation task and task 1 head 110-1, $L_{STL}^2$ associated with the depth prediction task and task 2 head 110-2, and $L_{STL}^3$ associated with the surface normal prediction task and task 3 head 110-3.

At operation 315, a plurality of task weights may be determined based on a comparison of the plurality of first losses and the plurality of second losses. An $i^{th}$ task weight may be determined based on a comparison of the $i^{th}$ first loss $L_{MTL}^i$ associated with the $i^{th}$ task-head of the multi-task neural network framework and the $i^{th}$ second loss $L_{STL}^i$ associated with the $i^{th}$ single-task neural network framework. As an example, a second task weight (associated with the depth prediction task for example) of the plurality of task weights may be based on a comparison of a second loss (associated with the depth prediction task-head) from the plurality of first losses and a second loss (associated with the depth prediction task) from the plurality of second losses.

At operation 320, the combination of task specific losses is based on a plurality of task weights may be determined. In some embodiments, the combination of task specific losses may be a linear combination of the plurality of first losses and the plurality of second losses.

The multi-task neural network framework may be trained based on the combination of task specific losses. In some embodiments, direct implementation of the above-mentioned online task weighting scheme may have a negative effect on the performance of the single-task neural network because the parameters of the single-task neural network would be affected by the parameters of the multi-task neural network. To avoid such a negative effect, the gradients of the combination of task specific losses may be disallowed from being back-propagated to the single-task neural networks. In an embodiment, the single-task intermediate features (e.g., tensors) may be detached from the computational graph of the respective single-task neural network model while computing the adaptive feature distillation loss.

In some embodiments, the single-task neural network models may be used only for training the multi-task neural network framework, and only the multi-task neural network framework may be used for inference. This enables the multi-task neural network framework to have similar computational and memory requirements as that of single-task neural network models during inference. Thus, adaptive feature distillation improves the performance of the multi-task neural network framework, while preserving its memory and storage efficiency.

Figure 4:
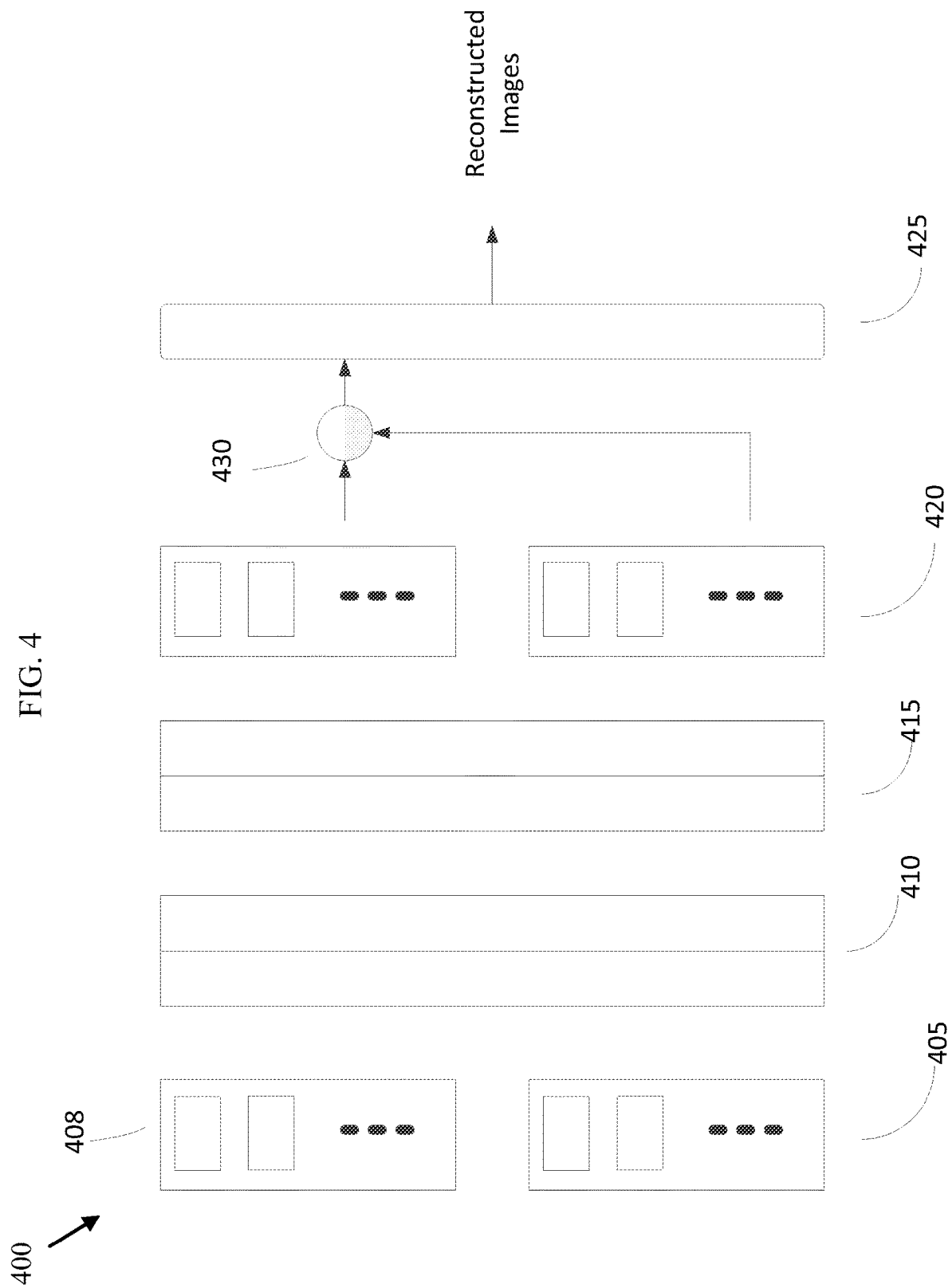
FIG. 4 is an exemplary block diagram for image processing using a multi-task neural network framework, according to an embodiment of the present disclosure.

FIG. 4 illustrates an exemplary block diagram illustrating an example process for image processing using a classification head 400 of multi-task neural network framework.

For a classification task, such as semantic segmentation of an input image, a suitable transformer architecture, e.g., ViT, ViT-tiny, or a mask architecture may be used. The image patches and a size of the patches may be input to the multi-task neural network. Patched embeddings 405 extracted from the transformer encoder backbone (e.g., multi-task transformer encoder 120) may be passed to the classification head transformer layers 410-415 of the multi-task neural network framework. In some embodiments, the patched embeddings may have a dimension of $N_{patch}*E$. For classification tasks, class queries (of dimension $N_{CLS} \times E$) may be introduced along with the patch embeddings and passed to the classification head transformer layers 410-415. A scalar product 430 of class queries and patch embeddings may be computed (of output dimension, $N_{patch} \times N_{CLS}$). The output may then be up sampled and reshaped 425 to the image size to generate reconstructed images. $N_{CLS}$ class maps may also be obtained, each having the same size as the input image. In some embodiments, pixel labels are may be estimated as the argmax of the $N_{CLS}$ class maps.

Figure 5:
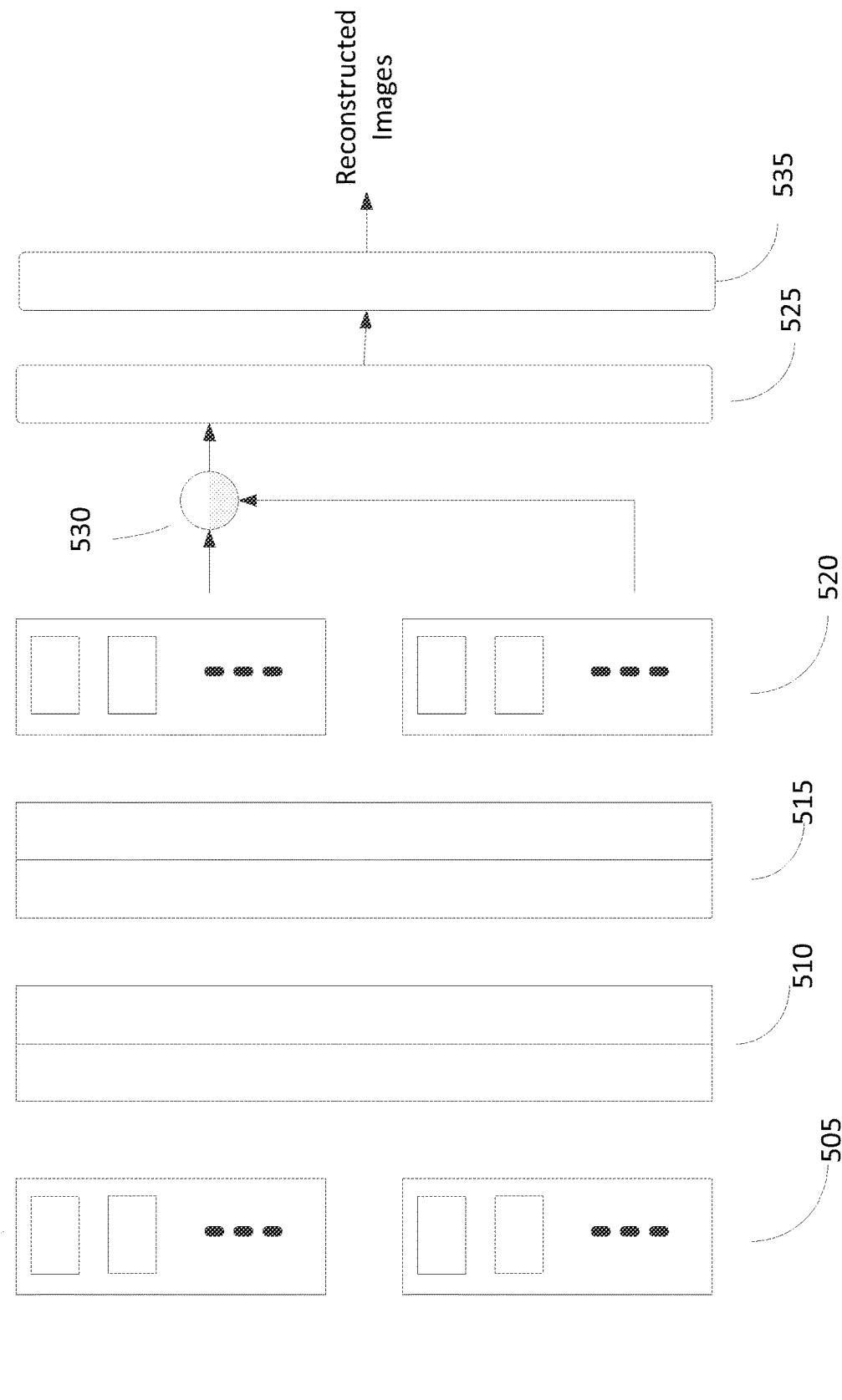
FIG. 5 is an exemplary block diagram for image processing using a multi-task neural network framework, according to an embodiment of the present disclosure.

FIG. 5 illustrates an exemplary block diagram illustrating an example process for image processing using a regression head 500 of a multi-task neural network framework.

For a regression task, such as depth prediction and surface normal prediction of an input image, a suitable transformer architecture, e.g., ViT, ViT-tiny, or a mask architecture may be used. The image patches and a size of the patches may be input to the multi-task neural network. Patched embeddings 505 extracted from the transformer encoder backbone (e.g., multi-task transformer encoder 120) may be passed to the regression head transformer layers 510-515 of the multi-task neural network framework. In some embodiments, the patched embeddings may have a dimension of $N_{patch}*E$. For regression tasks, a number of query embeddings ($N_{reg}$ that may be empirically set as 128) may be passed to the regression head transformer layers 510-515 of the multi-task neural network framework along with the patch embeddings. A scalar product 530 (of output dimension, $N_{patch} \times N_{reg}$) may be computed based on the query embeddings and patch embeddings. The scalar product may be passed through an MLP block 525 and one or more up sampling and reshaping layers 535. A sequence of linear layers may be used in the MLP block 525, with the output dimension of the last linear layer being based on the image processing task. As an example, the output dimension for depth prediction may be $N_{patch} \times 1$, whereas that of surface normal prediction may be $N_{patch} \times 3$. The output may then be up sampled and reshaped to generate reconstructed images having a same size as the input image.

Figure 6:
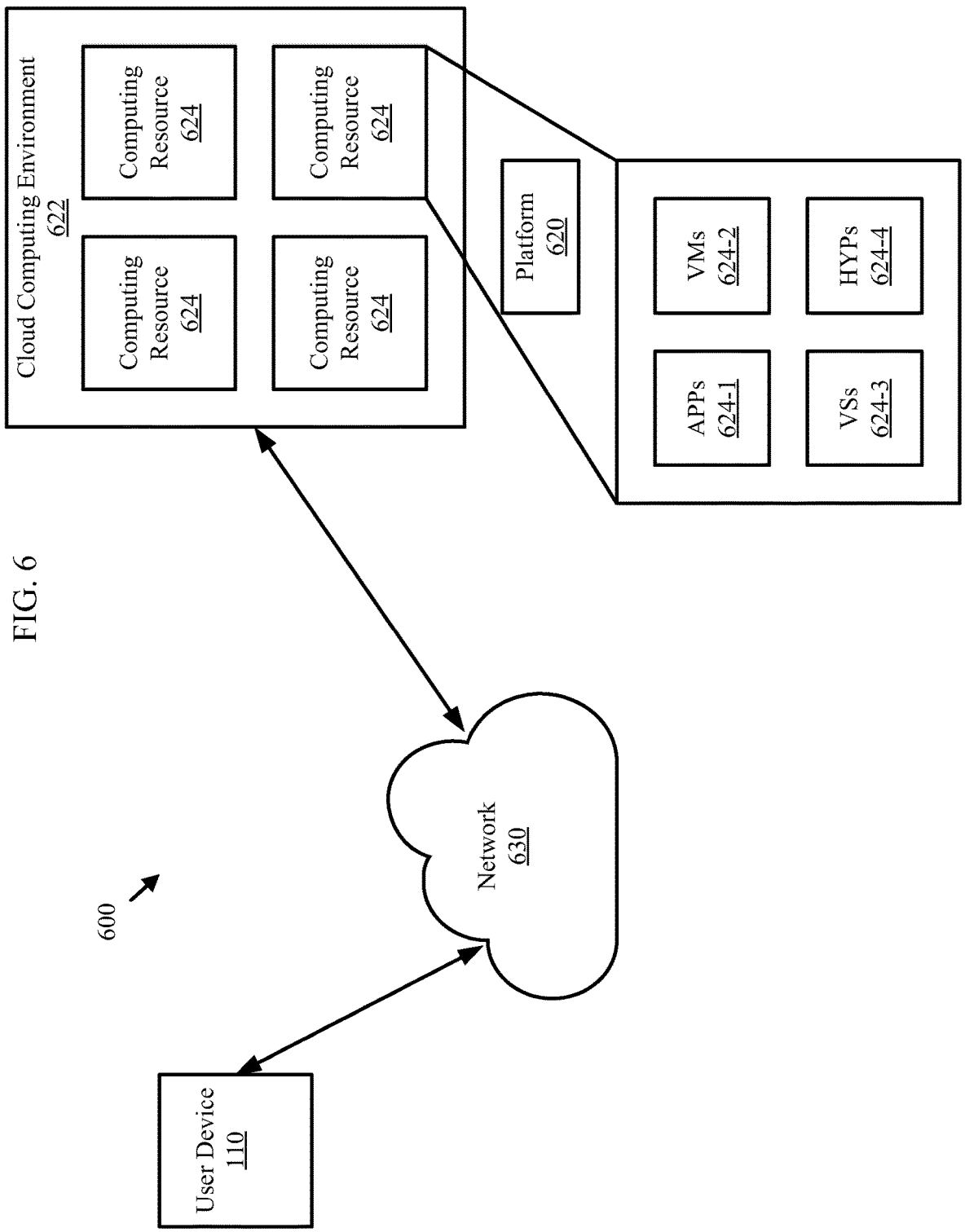
FIG. 6 is a diagram of example environment that may implement the neural network framework of FIG. 1, according to an embodiment of the present disclosure.

FIG. 6 is a diagram of an example environment for implementing one or more devices, operations, neural network, and/or frameworks of FIGS. 1-5.

As shown in FIG. 6, environment 600 may include a user device 110, a platform 620, and a network 630. Devices of environment 600 may interconnect via wired connections, wireless connections, or a combination of wired and wireless connections. In embodiments, any of the functions of the elements included in network infrastructure 100 may be performed by any combination of elements illustrated in FIG. 6. For example, in embodiments, user device 110 may perform one or more functions associated with a personal computing device, and platform 620 may perform one or more functions associated with any of the network element 115.

The user device 110 may include one or more devices capable of receiving, generating, storing, processing, and/or providing information associated with platform 620. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to platform 620.

Platform 620 may include one or more devices capable of receiving, generating, storing, processing, and/or providing information. In some implementations, platform 620 may include a cloud server or a group of cloud servers. In some implementations, platform 620 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 is not be cloud-based (i.e., may be implemented outside of a cloud computing environment) or may be partially cloud-based.

Cloud computing environment 622 includes an environment that hosts platform 620. Cloud computing environment 622 may provide computation, software, data access, storage, etc. services that do not require end-user (e.g., user device 110) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 includes one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 includes a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 includes one or more software applications that may be provided to or accessed by user device 110 or the network element 115. Application 624-1 may eliminate a need to install and execute the software applications on user device 110 or the network element 115. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 includes a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., user device 110), and may manage infrastructure of cloud computing environment 622, such as data management, synchronization, or long-duration data transfers.

Virtualized storage 624-3 includes one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 includes one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
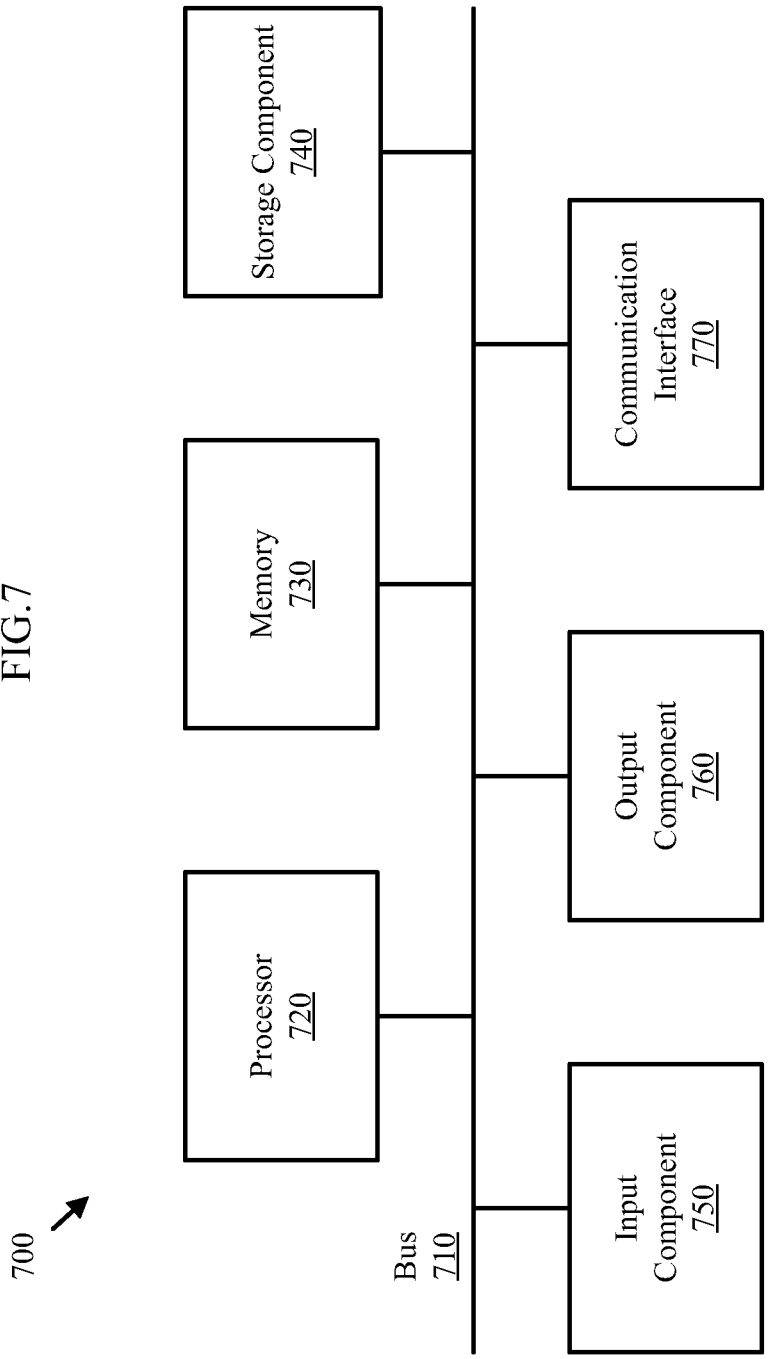
FIG. 7 is a diagram of example components of one or more devices that may implement the neural network framework of FIG. 1, according to an embodiment of the present disclosure.

FIG. 7 is a diagram of example components of one or more devices of FIG. 6 implementing one or more devices, operations, neural network, and/or frameworks of FIGS. 1-5.

FIG. 7 is a diagram of example components of a user device 110. The user device 110 may correspond to a device associated with an authorized user, an operator of a cell, or a RF engineer. The user device 110 may be used to communicate with cloud platform 620 via the network element 115. As shown in FIG. 7, the user device 110 may include a bus 710, a processor 720, a memory 730, a storage component 740, an input component 750, an output component 760, and a communication interface 770.

Bus 710 may include a component that permits communication among the components of the user device 110. Processor 720 may be implemented in hardware, firmware, or a combination of hardware and software. Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of the user device 110. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 750 includes a component that permits the user device 110 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from the user device 110 (e.g., a display, a speaker, and/or one or more light-emitting diodes (LEDs)).

Communication interface 770 includes a transceiver-like component (e.g., a transceiver and/or a separate receiver and transmitter) that enables the user device 110 to communicate with other devices, such as via a wired connection, a wireless connection, or a combination of wired and wireless connections. Communication interface 770 may permit the user device 110 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

The user device 110 may perform one or more processes described herein. The user device 110 may perform these processes in response to processor 720 executing software instructions stored by a non-transitory computer-readable medium, such as memory 730 and/or storage component 740. A computer-readable medium may be defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hard-wired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

What is claimed is:

1. A method for image processing using a multi-task neural network framework, the method being executed by one or more processors, the method comprising:
    receiving an input image;
    performing an image processing task based on the input image using the multi-task neural network framework, wherein the multi-task neural network framework is trained using a combination of task specific losses, the task specific losses including a plurality of first losses associated with the multi-task neural network framework and a plurality of second losses associated with a plurality of single-task neural network models, wherein the multi-task neural network framework comprises a shared transformer backbone network and a plurality of task specific heads, wherein each single-task neural network model from the plurality of single-task neural network models comprises a separate backbone network and a single head that performs a same task as a respective task specific head in the multi-task neural network framework, wherein the multi-task neural network is trained in accordance with an adaptive feature distillation loss that is determined based on a difference between one or more features of the multi-task neural network model and one or more features of each of the single-task neural network models; and
    generating an output of the image processing task based on up sampling an output of the multi-task neural network framework.

2. The method of claim 1, wherein the combination of task specific losses is based on a plurality of task weights, wherein the plurality of task weights correspond to respective task-heads of the multi-task neural network framework, and wherein a first task weight of the plurality of task weights is based on a comparison of a first loss from the plurality of first losses and a first loss from the plurality of second losses.

3. The method of claim 1, wherein the combination of task specific losses is a linear combination of the plurality of first losses and the plurality of second losses.

4. The method of claim 1, wherein the multi-task neural network framework and the plurality of single-task neural network models are trained simultaneously.

5. The method of claim 1, wherein a same loss function is associated with a task-head of the multi-task neural network framework and a respective single-task neural network model from the plurality of single-task neural network models.

6. The method of claim 1, wherein the image processing task includes one of semantic segmentation, depth estimation, surface normal estimation, image classification, or facial landmark localization.

7. The method of claim 1, wherein the image processing task comprises semantic segmentation of the input image, and wherein the method further comprises:
    generating, as the output of the image processing task, a plurality of class maps of a same size as the input image based on up sampling and reshaping the output of the multi-task neural network framework.

8. The method of claim 1, wherein the image processing task comprises one of depth prediction or surface normal prediction, and wherein the method further comprises:
    generating, as the output of the image processing task, one or more reconstructed images of a same size as the input image based on up sampling and reshaping the output of the multi-task neural network framework.

9. An apparatus for image processing using a multi-task neural network framework, the apparatus comprising:
    at least one memory configured to store program code; and
    at least one processor configured to read the program code and operate as instructed by the program code, the program code including:
        receiving code configured to cause the at least one processor to receive an input image;
        performing code configured to cause the at least one processor to perform an image processing task based on the input image using the multi-task neural network framework, wherein the multi-task neural network framework is trained using a combination of task specific losses, the task specific losses including a plurality of first losses associated with a plurality of task heads of the multi-task neural network framework and a plurality of second losses associated with a plurality of single-task neural network models, wherein the multi-task neural network framework comprises a shared transformer backbone network and a plurality of task specific heads, wherein each single-task neural network model from the plurality of single-task neural network models comprises a separate backbone network and a single head that performs a same task as a respective task specific head in the multi-task neural network framework, wherein the multi-task neural network is trained in accordance with an adaptive feature distillation loss that is determined based on a difference between one or more features of the multi-task neural network model and one or more features of each of the single-task neural network models; and generating code configured to cause the at least one processor to generate an output of the image processing task based on up sampling an output of the multi-task neural network framework.

10. The apparatus of claim 9, wherein the combination of task specific losses is based on a plurality of task weights, wherein the plurality of task weights correspond to respective task-heads of the multi-task neural network framework, and wherein a first task weight of the plurality of task weights is based on a comparison of a first loss from the plurality of first losses and a first loss from the plurality of second losses.

11. The apparatus of claim 9, wherein the combination of task specific losses is a linear combination of the plurality of first losses and the plurality of second losses.

12. The apparatus of claim 9, wherein the multi-task neural network framework and the plurality of single-task neural network models are trained simultaneously.

13. The apparatus of claim 9, wherein a same loss function is associated with a task-head of the multi-task neural network framework and a respective single-task neural network model from the plurality of single-task neural network models.

14. The apparatus of claim 9, wherein the image processing task comprises semantic segmentation of the input image, and wherein the program code further comprises:

output generating code configured to cause the at least one processor to generate, as the output of the image processing task, a plurality of class maps of a same size as the input image based on up sampling and reshaping the output of the multi-task neural network framework.

15. The apparatus of claim 9, wherein the image processing task comprises one of depth prediction or surface normal prediction, and wherein the program code further comprises:

output generating code configured to cause the at least one processor to generate, as the output of the image processing task, one or more reconstructed images of a same size as the input image based on up sampling and reshaping the output of the multi-task neural network framework.

16. A non-transitory computer-readable medium storing instructions for training a multi-task neural network framework for image processing, the instructions comprising: one or more instructions that, when executed by one or more processors, cause the one or more processors to:

train the multi-task neural network framework using a plurality of single-task neural network models, wherein the training comprises:

determining a plurality of first losses associated with a plurality of task heads of the multi-task neural network framework;

determining a plurality of second losses associated with the plurality of single-task neural network models; and training the multi-task neural network framework based on a combination of the plurality of first losses and the plurality of second losses, wherein the multi-task neural network framework comprises a shared transformer backbone network and a plurality of task specific heads, and wherein each single-task neural network model from the plurality of single-task neural network models comprises a separate backbone network and a single head that performs a same task as a respective task specific head in the multi-task neural network framework, wherein the multi-task neural network is trained in accordance with an adaptive feature distillation loss that is determined based on a difference between one or more features of the multi-task neural network model and one or more features of each of the single-task neural network models.

17. The non-transitory computer-readable medium of claim 16, wherein the combination of the plurality of first losses and the plurality of second losses is based on a plurality of task weights, wherein the plurality of task weights correspond to respective task-heads of the multi-task neural network framework, and wherein a first task weight of the plurality of task weights is based on a comparison of a first loss from the plurality of first losses and a first loss from the plurality of second losses.

18. The non-transitory computer-readable medium of claim 16, wherein the combination of the plurality of first losses and the plurality of second losses is a linear combination of the plurality of first losses and the plurality of second losses.

19. The non-transitory computer-readable medium of claim 16, wherein a same loss function is associated with a task-head of the multi-task neural network framework and a respective single-task neural network model from the plurality of single-task neural network models.

* * * * *